United States Patent
Lebrat

(10) Patent No.: US 9,285,480 B2
(45) Date of Patent: Mar. 15, 2016

(54) DETECTION AND CORRECTION OF CARRIER PHASE INCONSISTENCY DURING THE TRACKING OF A RADIO NAVIGATION SIGNAL

(75) Inventor: Jean-Philippe Lebrat, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 0 days.

(21) Appl. No.: 14/004,890

(22) PCT Filed: Mar. 16, 2012

(86) PCT No.: PCT/EP2012/054683
§ 371 (c)(1),
(2), (4) Date: Nov. 18, 2013

(87) PCT Pub. No.: WO2012/123577
PCT Pub. Date: Sep. 20, 2012

(65) Prior Publication Data
US 2014/0062771 A1   Mar. 6, 2014

(30) Foreign Application Priority Data

Mar. 16, 2011 (FR) ..................................... 11 00789

(51) Int. Cl.
| | |
|---|---|
| *G01S 19/29* | (2010.01) |
| *G01S 19/26* | (2010.01) |
| *G01S 19/43* | (2010.01) |
| *C10L 5/36* | (2006.01) |
| *C10L 5/40* | (2006.01) |
| *C10L 5/44* | (2006.01) |

(52) U.S. Cl.
CPC . *G01S 19/29* (2013.01); *C10L 5/36* (2013.01); *C10L 5/40* (2013.01); *C10L 5/44* (2013.01); *G01S 19/26* (2013.01); *G01S 19/43* (2013.01); *Y02E 50/10* (2013.01); *Y02E 50/30* (2013.01); *Y02T 50/678* (2013.01)

(58) Field of Classification Search
CPC ........ G01S 19/29; G01S 19/26; G01S 19/254
USPC ........................................ 342/357.68, 357.65
See application file for complete search history.

(56) References Cited

U.S. PATENT DOCUMENTS

| | | | | |
|---|---|---|---|---|
| 4,903,212 | A * | 2/1990 | Yokouchi et al. | 701/454 |
| 5,703,597 | A * | 12/1997 | Yu et al. | 342/357.65 |
| 5,969,672 | A * | 10/1999 | Brenner | 342/357.29 |
| 6,175,806 | B1 * | 1/2001 | Thuente | 701/477 |
| 6,720,913 | B1 * | 4/2004 | Schipper | 342/357.26 |
| 7,151,486 | B2 * | 12/2006 | Kim | 342/357.59 |
| 7,391,366 | B2 * | 6/2008 | Park et al. | 342/357.59 |

(Continued)

OTHER PUBLICATIONS

Hamm et al, "Comparative Perfomance Analysis of Aided Carrier Tracking Loop Algorithms in High Noise/High Dynamic Environments," Proc. ION GNSS 2004, 10 pgs, (2004).*

*Primary Examiner* — Gregory C Issing
(74) *Attorney, Agent, or Firm* — Blakely Sokoloff Taylor & Zafman LLP

(57) ABSTRACT

The invention relates to a method for tracking the carrier phase of a signal received from a satellite by a carrier using a carrier loop of the carrier phase, said signal being acquired by a navigation system of the carrier, said navigation system including a receiver for location by radio navigation, and a self-contained unit, wherein the receiver is suitable for acquiring and tracking the phase of the carrier of the signal from the satellite.

6 Claims, 3 Drawing Sheets

(56) References Cited

U.S. PATENT DOCUMENTS

Figure 1:
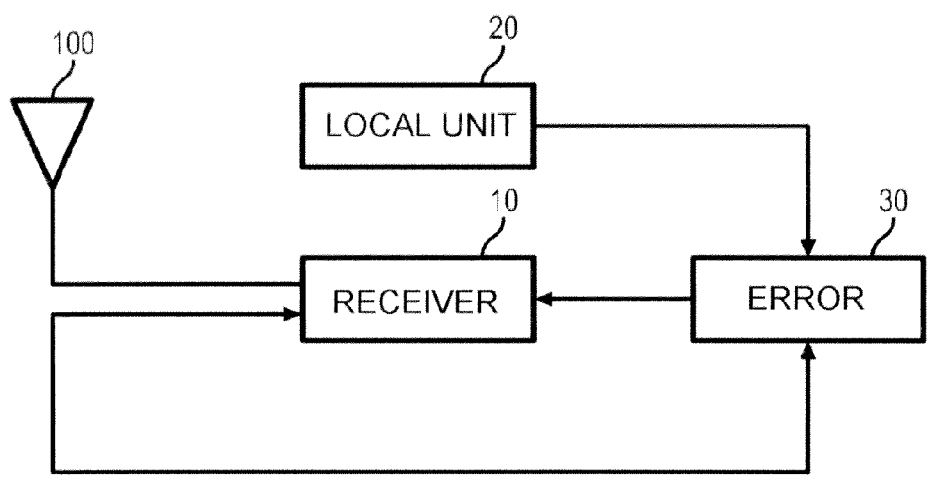

| | | |
|---|---|---|
| 7,415,354 B2 * | 8/2008 | Alexander .................... 701/474 |
| 2001/0020216 A1 | 9/2001 | Lin |
| 2007/0273582 A1 * | 11/2007 | Klinghult et al. ........ 342/357.06 |
| 2010/0253402 A1 | 10/2010 | Awata |
| 2011/0193741 A1 * | 8/2011 | Kumar ..................... 342/357.25 |

* cited by examiner

DETECTION AND CORRECTION OF CARRIER PHASE INCONSISTENCY DURING THE TRACKING OF A RADIO NAVIGATION SIGNAL

GENERAL TECHNICAL FIELD

The invention relates to radio navigation with satellites, notably to satellite radio navigation of the GNSS (<<Global Navigation Satellite Systems>>) type, and more particularly of the GPS (<<Global Positioning System>>), Galileo, GLONASS (<<Global Navigation Satellite System>>).

STATE OF THE ART

With satellite radio navigation, it is possible to obtain the position of a receiver by a method close to triangulation. The distances are measured from signals sent by satellites.

More specifically, a receiver for positioning via satellites notably allows delivery of a set of integrated pseudo-velocities or dopplers, each representing the projection on the axis connecting the receiver to each satellite with view to obtaining the relative velocity vector between the receiver and said satellite.

The signals transmitted by the satellites are formed by modulating the carrier of the signal with a spreading code. Thus, the satellite signals allow two types of measurements for localizing the receiver. Further, the modulation of the carrier with a spreading code extends the spectrum in the spectral band, which increases the resistance of the system to interference. And, additionally, this gives the possibility of disassociating the satellites (by using a different code for each satellite in the GPS case).

The first type of measurement uses the code of the received signal. The measurements based on the code, unlike the ones based on the carrier (see below) are not ambiguous, since the receiver is capable of evaluating the code period integer between the satellite and the receiver. But the measurements based on the code are much less accurate than those based on the carrier.

The second type of measurement is a measurement based on the carrier of the receiver. The measurements based on the carrier are accurate but ambiguous. Indeed, the receiver is only capable of evaluating the phase of the carrier, therefore the number of wavelengths between the satellite and the receiver remains unknown: there is therefore an ambiguity which has to be removed.

In order to carry out both of these types of measurements, the receiver acquires and tracks the received signal. For this, it generates replicas of the code and of the carrier, so called local replicas, which it correlates with the received signal. As the code and the carrier are inconsistent pieces of information, the generations of the code and carrier replicas are subordinated to two distinct loops.

The carrier loop is generally a phase-locked loop (PLL). The code loop as for it generally includes a double correlation allowing evaluation of the shift between the local code and the received code which corresponds to a difference of measurable energies.

The receiver uses both of these loops in order to obtain unambiguous accurate measurements.

In a first phase, a so-called acquisition phase, the receiver operates in an open loop for seeking the received signal by testing several position and velocity assumptions on the local code and on the local carrier. Each control loop is closed when the uncertainty on its input (position for the code and frequency for the carrier) becomes less than the field of application of the discriminant of the loop.

Thus, both loops are complementary during the phase for tracking the received signal: the carrier loop provides accuracy while the code loop provides robustness.

However, a source of a feedback error of the carrier loop is due to the crossing of the ionosphere by the waves from the satellites.

Such inaccuracies cause cycle jumps on the carrier loop, and therefore measurement errors without necessarily causing unlocking of the carrier loop so that there is no re-locking step of the carrier loop: the navigation solution is therefore erroneous.

PRESENTATION OF THE INVENTION

The invention allows the aforementioned drawbacks to be overcome.

For this purpose, according to a first aspect, the invention relates to a method for tracking the carrier phase of a signal received from a satellite with a carrier by means of a carrier phase-locked loop, said signal being acquired by a navigation system of the carrier which comprises a localization receiver by radio navigation and a self-contained unit, the receiver being adapted so as to acquire and track the phase of the carrier of the signal stemming from the satellite.

The method comprises the following steps:
determining a closed-loop control error of the carrier phase loop, said closed-loop control error being determined between two sampling instants and corresponding to a first phase deviation;
determining a variation of acceleration of the carrier between both sampling instants by means of a self-contained unit;
projecting the variation of acceleration on a satellite-receiver view axis in order to obtain a second phase deviation;
comparing the first and second deviations in order to detect; an, error on the measurement of the carrier phase tracked by said carrier phase loop.

The method according to the invention may further include either one of the following aspects:
the variation of acceleration of the carrier is obtained by means of a numerical model implemented in a module of the navigation system;
the variation of acceleration of the carrier is determined by means of an inertial unit of the navigation, system;
the comparison consists of determining inconsistency of the first deviation with the second deviation;
the inconsistency is integrated over a sliding period with a duration of the order of one to five times a time constant of a filter of the carrier phase loop and then compared with a threshold, typically $\lambda/4$, the method comprises a step for generating a replica signal of the received signal from the phase deviation $\{\delta\gamma_n \cdot \delta t^2\}_{projected}$ stemming from the self-contained unit;
it comprises a step for determining a navigation solution from integrated dopplers stemming from the generated replica signal,
if the inconsistency is greater than the threshold, typically of the order of $\lambda/4$, the method comprise a step for correcting the integrated dopplers required for the navigation solution, the correction consists of adding a term $k \cdot \lambda/2$ to said Integrated dopplers wherein k is a relative integer such that the absolute value of the integrated inconsistency is less than a threshold, the threshold being typically of the order of $\lambda/4$;

it comprises a step for determining a navigation solution from the corrected integrated dopplers;

the comparison consists of calculating an inconsistency term defined in the following way:

$$\frac{\lambda}{2\pi} \cdot \{\delta\varphi_n\}_{rectified} - \{\delta\gamma_n \cdot \delta t^2\}_{projected}$$

wherein $\{\delta\phi_n\}_{rectified}$ is the first phase deviation and $\{\delta\gamma_n \cdot \delta t^2\}_{projected}$ is homogeneous to a distance corresponding to the second phase deviation and $\lambda$ is the wavelength associated with the carrier frequency of the received signal.

According to a second aspect, the invention relates to a navigation system comprising means for applying a method according to the first aspect of the invention.

PRESENTATION OF THE FIGURES

Figure 2:
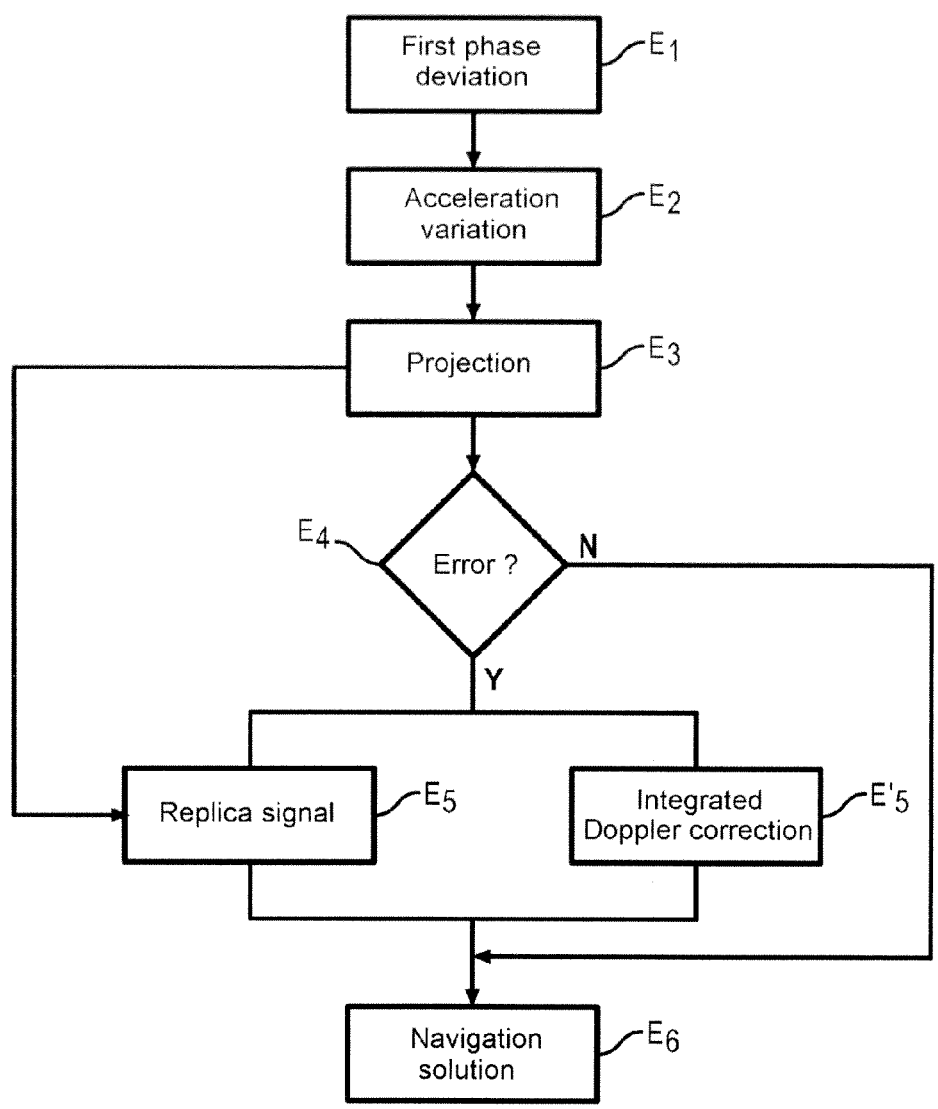
Figure 3:
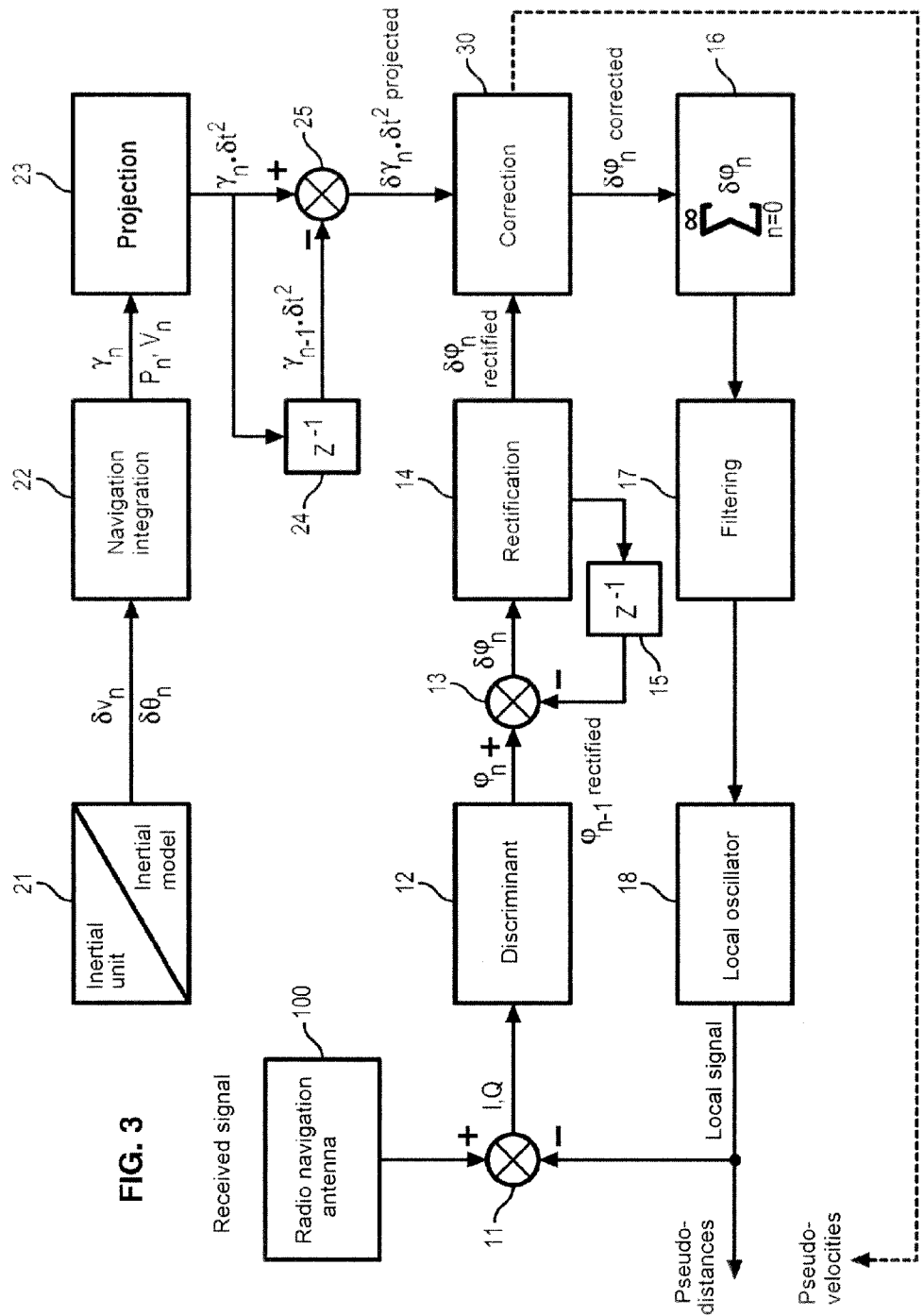

Other features and advantages of the invention will become further apparent from the description which follows, which is purely illustrative and non-limiting and should be read with reference to the appended drawings wherein:

FIG. 1 schematically illustrates a navigation system according to the invention;

FIG. 2 schematically illustrates steps of the method according to the invention;

FIG. 3 illustrates in a detailed way a navigation system according to the invention.

DETAILED DESCRIPTION OF THE INVENTION

In FIG. 1, a navigation system on board a carrier typically an aircraft, to be localized, is illustrated.

Such a navigation system includes a receiver 10 for localization by radio navigation, preferably a GPS or GNSS receiver. The receiver may be a multi-channel receiver and in this case each channel corresponds to one satellite which transmits a signal received by the receiver 10.

The receiver 10 includes a receiving antenna 100 capable of receiving a signal stemming from one or several satellites (not shown).

The case is considered when the signal received by the navigation system is a GPS signal.

In a known way, the radio navigation signals transmitted by satellites appear as a carrier modulated by a spread waveform containing a pseudo-random binary code. The modulation of the carrier causes spreading of the spectrum around the frequency of the carrier, the radio navigation signals have a spread spectrum.

The pseudo-random codes represent an identifier of the signal and therefore of the transmitter satellite.

Further, certain signals for positioning by satellite may also convey useful data (for example the navigation message) as a binary sequence (at a significantly lower rate than the pseudo-random code) modulating the signal from the carrier modulated by the code.

In the case of the GPS, the radio navigation signals are transmitted in the frequency bands L1, centred on 1575.42 MHz and L2, centred on 1227.6 MHz.

Further, the navigation system of FIG. 1 includes a self-contained unit 20 and a unit 30 for detecting and correcting possible loop control errors. It is specified here that the self-contained unit 20 does not receive any signal from one or more satellites and is consequently autonomous. The measurements which it provides are subsequently distinguished from the other ones by the descriptive term of autonomous.

The receiver 10 operates in a known way in an acquisition or tracking mode.

It is considered here that one is in a tracking mode, i.e. that the receiver gives the possibility of providing a navigation solution, from a set of pseudo-distances and of pseudo-velocities or integrated dopplers which allow localization of the carrier.

It is from these measurements that the navigation solution of the carrier is determined.

In particular, this is the resolution of a set of equations obtained from the pseudo-measurements. These processing operations will not be detailed subsequently since they are well known to one skilled in the art.

More specifically, the reception of a radio navigation signal comprises a first demodulation by means of an internal replica of the carrier phase generated in the receiver by an oscillator driven by a carrier phase tracking loop and a second demodulation by means of an internal replica of the form of the spreading code produced by a code tracking loop.

The control signals of the carrier phase and code tracking loops are used by the receiver for determining the pseudo-measurements, with which the navigation solution may be obtained.

As this was already mentioned above, the navigation system Includes a unit 30 for detecting and correcting closed-loop control errors.

This unit 30 gives the possibility of applying a method for monitoring the loop for tracking the carrier phase of the signal received from a satellite. Such a method is of course implemented for each channel in the case when the receiver is a multi-channel receiver.

The object of this method Is to detect one or several cycle jumps in the phase of the carrier and to correct them.

Steps of such a method are schematically illustrated in FIG. 2.

In a first step E1, a closed-loop control error of the carrier phase loop is determined between two instants. Thus this closed-loop control error is a first phase deviation. This phase deviation allows the carrier phase tracking loop to get back in step.

This first phase deviation is taken between consecutive samples measured at the output of the carrier phase loop. Such a phase deviation is expressed by $\delta\gamma_n = \phi_n - \phi_{n-1}$ wherein n is an index corresponding to the calculation instant.

In a second step E2 (which may practically be applied before or in parallel with the first step E1 described above) a variation of acceleration of the carrier is determined between both instants.

This variation of acceleration is determined by the self-contained unit 20 of the navigation system.

According to an embodiment, the self-contained unit 20 may include an inertial numerical model which allows determination of the acceleration variation of the carrier relatively to the satellite.

Taking into account that the movement of the satellite (the carrier in this case) is mainly governed by Kepler's laws; accordingly, the position of the satellite is determined from the orbital Kepler-parameters. The velocity of a satellite is determined by differentiation (preferentially an exact formula) or by differentiation of the position. The acceleration is obtained by differentiation of the velocity.

According to another embodiment, the self-contained unit 20 is an inertial unit.

As this is known, an inertial unit mainly consists of two groups of three sensors. The groups of sensors are gyrometers (rotation measurements) and accelerometers (acceleration measurements). The three sensors of each group are oriented in order to capture the movements in space (in three dimensions). Integration of the accelerometric measurements provides the velocity along the axis of each accelerometer, and integration of the velocities provides the position of each accelerometer along its axis. The integrations call for determination of the initialization constants: this is the subject of inertial alignment.

As the movement of a mobile is arbitrary, the orientation of the axes of the accelerometers varies, therefore it is necessary to project the acceleration measurements in a reference coordinate system: this is the purpose of the gyrometers to determine the rotation of the measurement axes of the accelerometers.

Thus, in a third step E3, the acceleration variation is projected on a satellite-receiver view axis so as to obtain a relevant measurement, this projected acceleration variation representing a second phase deviation.

The projection of the acceleration variation is homogeneous to meters (m) and as a wavelength is equivalent to $2\pi$ radians, it is possible to simply switch from the projected acceleration variation to a carrier phase deviation.

Next, in a fourth step E4, the first and second deviations are compared in order to detect a possible error on the carrier phase tracked by the carrier phase loop.

The question here is in particular to identify whether the phase deviation allowing the carrier phase loop to be driven is erroneous or inconsistent or else if it is subject to cycle jumps.

Finally, in a fifth step E5, the navigation solution is determined from the phase deviation measured by the carrier loop and optionally corrected from the projected acceleration variation stemming from the measurements carried out by the self-contained unit 20.

The radio navigation solution is determined from pseudo-measurements, for example by a least squares algorithm, and applies a phase deviation.

The comparison E4 notably consists of determining inconsistency of the first deviation with the second deviation.

If the determined inconsistency is greater than the threshold, an inconsistency alert may be suppressed, the second phase deviation replaces the first and the determination E6 of the navigation solution stems from the corrected closed-loop control.

Alternatively, the determination E6 of the navigation solution is carried out from corrected pseudo-measurements.

A detailed scheme of a navigation system is also illustrated in FIG. 3.

Like in the diagram of FIG. 1, a signal of the GPS type is received by a radio navigation antenna 100.

At the antenna 100, the signal is pre-amplified and then filtered, undergoes lowering in frequency and finally undergoes analogue/digital conversion being processed digitally.

In a known way, in a tracking mode, a carrier phase loop tracks the carrier phase of the received signal. The carrier phase loop is driven by a local oscillator 18 with which during the tracking of the carrier phase a phase deviation between the local replica and the received signal may be corrected. Indeed, the navigation solution is calculated from the local signal which has to be a quasi-perfect replica of the received signal.

At the local oscillator 18, a local replica signal is generated. Such a replica signal is formed in a known way by a carrier (sine wave) modulated with a pseudo-random binary code; it is sampled at a frequency of the order of a few MHz to a few tens of MHz. The frequency of the replica of the carrier is equal to the transmission frequency of the carrier by the satellite (1.57542 GHz in the case of GPS L1), reduced with the frequency lowering by the receiver, or increased by the purpose of the closed-loop control on the carrier phase is specifically to determine this relative Doppler component. The frequency of the replica of the code is equal to the transmission frequency of the code by the satellite (1.023 MHz in the case of the GPS C/A code), increased by the driving of the code by the carrier (i.e. by the estimated Doppler component by the carrier loop), and increased by the code-carrier inconsistency, object of the code control loop.

From the received signal and the local signal generated by the local oscillator 18, a phase channel I and a quadrature channel Q of the correlation product of both signals are determined, channels which will be used subsequently.

Channel I is in particular the integral of the product of the received signal by the local signal, this integration being carried out at a frequency of the order of a few to a few tens of MHz (see the sampling frequency of the local oscillator 18) and on a horizon of 1 ms or an epoch of the C/A code, the channel I then being provided at the output and then reset to zero.

Channel Q is determined in a similar way to channel I but the local signal has a carrier phase advance of $\pi/2$ relatively to the one used for calculating channel I.

From these two channels I, Q, a carrier loop discriminant is determined 12. Such a discriminant is obtained by calculating $$\mathrm{Arctan}\left(\frac{Q}{I}\right).$$

From this discriminant, a value of the phase of the carrier $\phi_n$ is inferred.

As the received signal includes navigation data coding a piece of information, the carrier phase is rectified 13, 14, 15 for removing these data.

The question is to notably determine 13, 15 a phase deviation taken between two calculation instants (or else two samples): $\delta\phi_n = \phi_n - \phi_{n-1}$.

This phase deviation $\delta\phi_n$ will give the possibility of obtaining 14 a rectified phase deviation $\{\delta\phi_n\}_{rectified}$.

In particular, if $\delta\phi_n > \pi/2$ then $\delta\phi_n$ is reduced by $\pi$ while if $\delta\phi_n < -\pi/2$ then $\delta\phi_n$ is increased by $\pi$.

This is therefore a rectified phase deviation $\delta\phi_n$ which is used for determining whether there is an ambiguity on the carrier phase.

It is this phase deviation $\{\delta\phi_n\}_{rectified}$ which is integrated 16 during the whole duration of the servo-control and then filtered by a loop of the third order 17 and then sent to the input of the local oscillator 18 for generating a replica signal of the received signal.

The error detection and correction module 30 may have to correct an error beforehand.

To do this, the module 30 receives the phase deviation $\{\delta\phi_n\}_{rectified}$ stemming from the carrier phase loop (dynamics measured by the carrier phase loop) on the one hand and the autonomous dynamics which in fact is an acceleration variation projected on a satellite-carrier view axis.

The acceleration variation determined by the self-contained unit 20 is obtained either from an inertial model or from an inertial unit 23.

Such an acceleration variation is obtained by determining autonomous dynamics processed by a module for integrating the navigation 22 in order to obtain an autonomous measurement and therefore an absolute measurement of the acceleration $\gamma_n$ of the position $P_n$ and of the velocity $V_n$.

The acceleration variation is projected on a satellite-receiver view axis by a projection module 23.

From this projection, a therefore autonomous variation of the acceleration projected on a $\{\delta\gamma_n \cdot \delta t^2\}_{projected}$ view axis is obtained.

The acceleration variation is determined over the same calculation period as the one for determining the phase variation at the carrier phase loop.

In order to detect a possible error, the correction module 30 determines an inconsistency term defined in the following way:

$$\frac{\lambda}{2\pi} \cdot \{\delta\varphi_n\}_{rectified} - \{\delta\gamma_n \cdot \delta t^2\}_{projected}$$

wherein $\{\delta\phi_n\}_{rectified}$ is the first phase deviation, $\{\delta\gamma_n \cdot \delta t^2\}_{projected}$ is homogeneous to a distance corresponding to the second projected phase deviation and $\lambda$ is the wavelength associated with the carrier frequency of the received signal.

If the term above is greater than the threshold, the measurement of the carrier phase $\{\delta\phi_n\}_{rectified}$ is marred with an error.

In this case, there are two solutions for suppressing the error.

The first solution consists of using E5 the phase deviation obtained from the self-contained unit 20, $\{\delta\gamma_n \cdot \delta t^2\}_{projected}$ for generating the replica signal.

In that case, the threshold is of the order of $3\sigma_{\phi_n}$ at $\lambda/4$ wherein $\sigma_{\phi_n}$ is a function of the signal-to-noise ratio.

It is this replica signal which will be used for measuring the pseudo-velocities or integrated dopplers required for calculating the navigation solution.

The second consists of correcting E5' the integrated dopplers by adding to them a term $k \cdot \lambda/2$ wherein k is a relative integer such that $|inconsistency|_{intergrated} <$threshold. In particular the inconsistency is integrated over a sliding period with a duration of the order of 1 to 5 times the constant of the filter of the control loop on the carrier. The threshold is of the order of $\lambda/4$.

The first solution is only applicable when the estimation 25 of $\{\delta\gamma_n \cdot \delta t^2\}_{projected}$ is available at the calculation instant of the filtering 17.

The second solution is applicable in all cases, but becomes mandatory when the first solution is not applicable. In this case, the carrier phase deviation $\{\delta\phi_n\}_{rectified}$ has to be stored in memory so that the calculation of the inconsistency term deals with synchronized (i.e. stemming from the same time period) autonomous and radio navigation measurements.

The invention claimed is:

1. A method for tracking the carrier phase of a signal received from a satellite by a mobile carrier device by means of a carrier phase tracking loop, said signal being acquired by a navigation system of the mobile carrier device which comprises a localization receiver (10) by radio navigation, a local oscillator and an autonomous unit (20), the receiver (10) being adapted for acquiring and tracking the phase of the carrier of the signal from the satellite, the method comprising the following steps:
    generating, by the local oscillator, a replica signal of the received signal,
    determining (E1) a closed-loop control error of the carrier phase loop from the received signal and from a local signal, wherein said closed-loop control error is determined between two sampling instants and is represented by a first phase deviation;
    determining (E2) an acceleration variation of the mobile carrier device between the two sampling instants by means of the autonomous unit (20);
    projecting (E3) the acceleration variation on a satellite-receiver view axis for obtaining a second phase deviation;
    comparing (E4) the first and second deviations in order to detect an error on the measurement of the carrier phase tracked by said carrier phase loop, said comparison including determining an inconsistency term representing an inconsistency of the first phase deviation with the second phase deviation;
    updating the replica signal using one of the first and second phase deviations, depending on a value of the inconsistency term;
    integrating the inconsistency term over a sliding period so as to produce an integrated term, then
    comparing the integrated term with a threshold, and
    updating the replica signal using the second phase deviation if the integrated term is greater than the threshold.

2. The method according to claim 1, wherein the acceleration variation of the mobile carrier device is determined by means of an inertial unit (21) of the navigation system.

3. The method according to claim 1, comprising a step for producing integrated dopplers from the generated replica signal, and a step (E6) for determining a navigation solution from said integrated dopplers.

4. The method according to claim 3, wherein if the inconsistency term is greater than the threshold, the method comprises a step (E5') for correcting the integrated dopplers, the correction consisting of adding a term $k \cdot \lambda/2$ to said integrated dopplers wherein k is an integer such that the absolute value of the integrated inconsistency term is less than the threshold, and wherein $\lambda$ is the wavelength associated with the carrier frequency of the received signal.

5. The method according to claim 4, comprising a step (E6) for determining a navigation solution from the corrected integrated dopplers.

6. The method according to claim 1, wherein the threshold is $\lambda/4$, wherein $\lambda$ is a wavelength associated with the carrier frequency of the received signal.

* * * * *